ered by the Secretary of the Navy
United States Patent

Welk, Jr.

[15] 3,665,767
[45] May 30, 1972

[54] FLUIDIC PRESSURE INDICATOR

[72] Inventor: Horace B. Welk, Jr., Churchville, Pa.

[73] Assignee: The United States of America as represented by the Secretary of the Navy

[22] Filed: Jan. 27, 1971

[21] Appl. No.: 110,202

[52] U.S. Cl. ........................73/407 R, 73/DIG. 8, 73/410, 137/81.5
[51] Int. Cl. .........................................................G01l 13/02
[58] Field of Search.............73/116, 115, 388 B, 410, 467 R, 73/37; 116/70, 65; 137/81.5

[56] References Cited

UNITED STATES PATENTS 3,228,602   1/1966   Boothe.............................137/81.5 X
3,153,934   10/1964   Reilly...................................73/388 R Primary Examiner—Donald O. Woodiel
Attorney—R. S. Sciascia, Henry Hansen and Gilbert H. Hennessey

[57] ABSTRACT

To form a fluidic pressure gauge a pair of back pressure sensor nozzles are mounted in gapped adjacency to the movable ends of respective bellows or diaphragms. One bellows is connected, for example, to communicate with the engine oil pressure while the other communicates with a suitable reference pressure. The output leg of each nozzle is connected to a differential pressure gauge. Another form of the invention yields a nonanalog indication when the oil pressure is outside a certain range. The ends of the bellows are connected together by a pivoting arm which operates a linearly movable slotted bar. An interruptable jet is mounted adjacent the slotted bar and connected to a fluidic logic gate whose outputs operate pneumatic indicators.

8 Claims, 2 Drawing Figures

INVENTOR.
HORACE B. WELK Jr.

FLUIDIC PRESSURE INDICATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to the fields of fluidics and pressure gauges, and more specifically to pressure responsive analog and digital fluidic systems.

Prior art pressure gauges having remote indicators ordinarily employ an expandable bellows or diaphragm coupled through a complex mechanical linkage to a master transmitting synchro. A slave synchro receives a signal from the master synchro and moves an indicator accordingly. In many situations the usefulness of the analog indication provided does not warrant the complex machinery needed for its generation. Moreover, in combustible environments it is hazardous to use unnecessary electrical instruments. Delicate electro-mechanical sensors are also subject to excessive wear and require frequent adjustment.

SUMMARY OF THE INVENTION

Accordingly, the general purpose of the invention is to sense and convert pressure variations to visual indications at a remote location without using electrical instruments. Another object of the invention is to apply fluidic techniques to sense and display pressure changes. A further object of the invention is to convert analog variations in pressure to digital fluidic levels indicative of a predetermined pressure range.

These and other objects of the invention are achieved by mounting a pair of back pressure sensor nozzles adjacent the movable ends of respective bellows or diaphragms such that elongation of the bellows tends to restrict the flow of air from the nozzles resulting in higher back pressure. One bellows is connected to communicate, for example, with engine oil pressure while the other communicates with a suitable reference pressure, such as the air surrounding the engine, sampled in the engine gear case. The output leg of each nozzle is connected to a differential pressure gauge so that the reading is independent of barometric pressure or altitude. Another form of the invention yields a nonanalog indication that oil pressure is above or below a certain range. The ends of the two bellows are connected together by a pivoting arm which acts as a balance and operates a linearly movable slotted bar connected to one end of the arm. An interruptable fluidic jet connected to a fluidic logic gate is mounted adjacent the slotted bar. The gate outputs operate pneumatic indicators.

DESCRIPTION OF THE PREFERRED EMBODIMENTS

Figure 1:
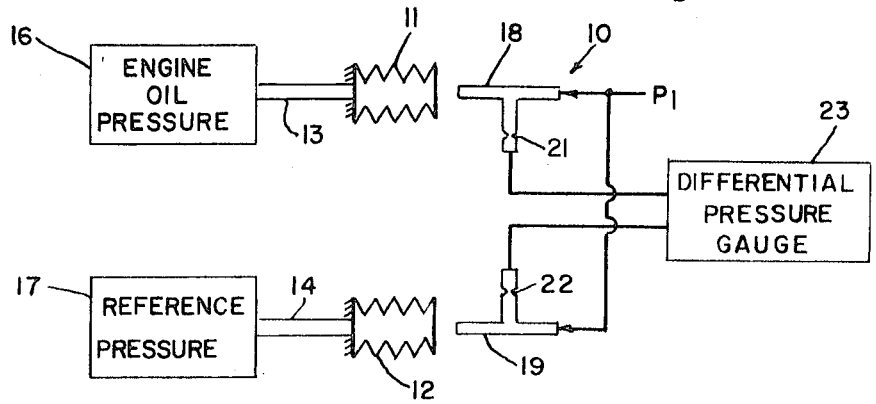
FIG. 1 is a block and schematic diagram of one of a pressure gauge according to the invention.

Referring to the drawing, a pressure gauge suitable for measuring the lubricating oil pressure of an airplane engine, for example, is shown generally at 10 and includes a pair of expandable bellows 11 and 12 having fixed ends connected respectively via pipes 13 and 14 to a source 16 of engine oil pressure and a source 17 of a suitable reference pressure such as the atmosphere in the engine gear case or the engine breather pressure. Fixed back pressure sensor nozzles 18 and 19 are mounted in gapped adjacency to the movable ends of bellows 11 and 12 respectively so that elongation of bellows 11 and 12 further restricts the flow of air out of the open ends of nozzles 18 and 19 supplied with pressure from the same source $P_1$. Nozzles 18 and 19 have respective output legs with restrictive orifices 21 and 22 connected by respective conduits to a differential pressure gauge 23. Gauge 23 may comprise a conventional bourdon tube (not shown) having a hermetically sealed case which is vented, for example, to receive pressure through orifice 22, while the bourdon tube itself would be connected to receive pressure via orifice 21. The extension of the bourdon tube reflects the differential pressure. With an increase in altitude the barometric pressure would drop causing a drop in the oil pressure from source 16. A similar drop will occur in reference pressure 17 which, when subtracted from pressure 16, normalizes the oil pressure reading over all barometric pressures. Bellows 11 and 12 do not have to be enclosed in a sealed case with constant pressure since variations in the air pressure surrounding bellows 11 and 12 will cancel out of the ultimate reading on gauge 23.

The accuracy of the analog instrument of FIG. 1 is useful in many situations, but in others it may be inappropriate. For example, a pilot is normally interested in whether the engine oil pressure is within a certain range. This type of indication is binary and can be implemented in the following manner.

Figure 2:
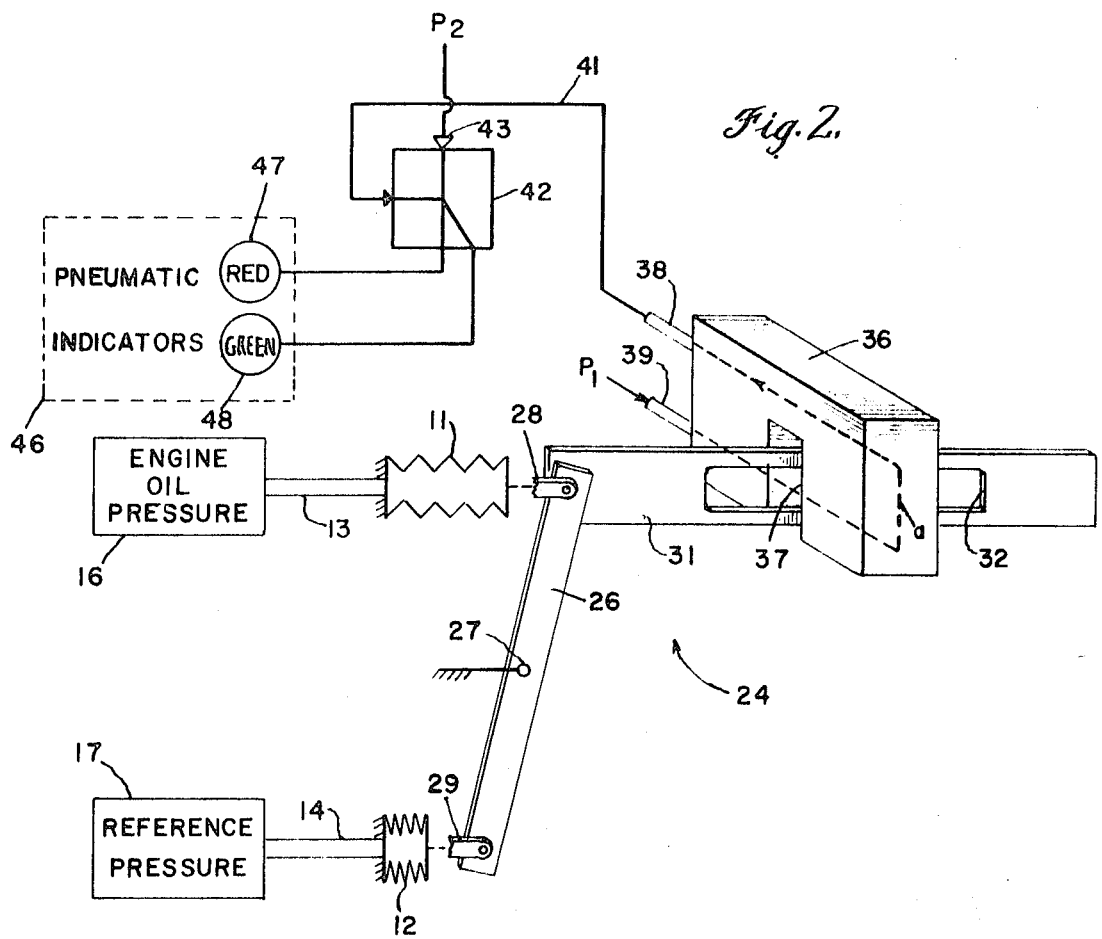
FIG. 2 is a block and schematic diagram of an alternative embodiment of a digital pressure gauge according to the invention.

Referring to FIG. 2, using the same pressure sources 16 and 17, the movable ends of bellows 11 and 12 are coupled via arms 28 and 29 directly to a pivoting balance yoke 26 rotatable about fixed pin 27 in response to relative movement of bellows 11 and 12. A linearly movable bar 31 having an elongated slot 32 is attached to one end of yoke 26. An interruptable jet unit 36 has a notch 37 which fits over bar 31 so that bar 31 can move back and forth freely within notch 37. Pneumatic pressure from a source $P_1$ is received at an inlet 39 in unit 36. Air flows from inlet 39 following path a to one side of notch 37. On the opposite side of notch 37, the path is resumed passing upwardly and back over notch 37 in the opposite direction to an outlet 38. Notch 37 would typically be one-eighth of an inch wide.

An OR/NOR fluidic logic gate 42 receives supply pressure from source $P_2$ at inlet 43. The control input for gate 42 is connected via fluid line 41 to outlet 38. Gate 42 has two binary output lines connected respectively to pneumatic indicators 46 comprising one red and one green indicator 47 and 48 respectively. Indicators 47 and 48 may comprise conventional flag type indicators or commercially available pneumatic pop-up fluorescent indicators.

In operation, it will be understood that the excursion of yoke 26, directly coupled to bellows 11 and 12 of FIG. 2, is sufficient to cause complete excursion of bar 31 so that either unslotted end of bar 31 may pass within notch 37. Since bellows 11 and 12 are coupled together in a differential fashion the air pressure immediately surrounding the bellows will not affect them. As barometric pressure drops the gauge oil pressure would also drop in conventional equipment. However, reference pressure source 17, which may be the atmosphere surrounding the engine, for example, also drops with barometric pressure, and when the difference between the pressures from sources 16 and 17 are generated, only the actual pressure attributable to the oil is reflected.

In FIG. 2 if the pressure in bellows 11 and 12 were equal, yoke 26 would be in a vertical orientation. However, if the pressure in bellows 11 exceeds that of bellows 12, as it normally would, yoke 26 is rotated clockwise causing bar 31 to move farther to the right so that a different portion is centered in notch 37. The length of slot 32 in bar 31 is designed to correspond to the acceptable range for oil pressure for example from 50 to 85 p.s.i., levels above or below this range being unacceptable. When the oil pressure is within this range, path a across notch 37 is unobstructed since the slot 32 is within notch 37. The flow at outlet 38 causes the flow due to pressure $P_2$ in gate 42 to be deflected into the diagonal output leg connected to green indicator 48. Now if bar 31 is caused to move beyond slot 32 by a severe increase or decrease in oil pressure, path a will be blocked by the solid portion of bar 31. In this condition there would be no output from outlet 38 and therefore no control input to gate 42. Consequently, the flow due to $P_2$ will continue straight through gate 42 into the straight output leg to operate red indicator 47 alerting the operator of a malfunction.

Alternative arrangements for bellows 11 and 12 in FIG. 2 are possible. The only requirement is that a movable element be linearly responsive to oil pressure corrected for barometric changes.

The instruments of FIGS. 1 and 2 obviously have application to any pressure sensing system and are not intended to be limited to sensing the pressure of lubricating oil for engines. The advantages of the invention lie principally in the elimination of the complex linkages used in prior art electro-mechanical pressure gauges The use of fluidics insures safe operation in combustible environments.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A differential pressure indicating system, comprising:
    a pair of pressure responsive means adapted to receive respective input pressures for converting changes therein to linear motion;
    a pair of nozzles operatively mounted adjacent said pressure responsive means respectively, each nozzle having a fluid supply inlet and a back pressure outlet providing a fluid output; and
    differential pressure gauge means connected to both nozzle outlets for indicating the back pressure difference between said nozzle outputs.

2. An indicating system according to claim 1 further comprising:
    each said pressure responsive means including a bellows, said nozzles operatively mounted at one end of said bellows respectively, such that movement of each said one end under pressure variation causes partial restriction of the corresponding nozzle.

3. A binary pressure gauge system for indicating whether the difference between two input pressures is within a predetermined range, comprising:
    differential pressure sensing means adapted to receive the input pressures for converting the pressure difference therebetween to proportional linear motion;
    interruptable jet means having a fluid supply inlet and an outlet providing a binary fluid output;
    baffle means connected to said sensing means for interrupting said jet means when said pressure difference is outside of the predetermined range; and
    logic means connected to said jet means outlet for indicating the level of said jet means output.

4. A pressure gauge system according to claim 3 further comprising:
    said logic means including gate means operatively receiving said jet means output for providing two outputs indicative respectively of the binary levels thereof; and
    pneumatic indicator means operatively connected to receive said gate means outputs.

5. A pressure gauge system according to claim 4 further comprising:
    said gate means including a fluidic OR/NOR logic gate having a fluid supply inlet and a control inlet connected to receive said jet means output; and
    said pneumatic indicator means including a pair of color-coded pneumatic indicators connected respectively to said gate means outputs.

6. A pressure gauge system according to claim 3 further comprising:
    said baffle means including a linearly movable member having a slot corresponding to the predetermined range; and
    said jet means including means for defining a fluid path having a gap, said member passing through said gap.

7. A pressure gauge system according to claim 6 further comprising:
    said jet means including a body housing said fluid path and having a notch forming said gap, said baffle member passing through said notch.

8. A pressure gauge system according to claim 7 further comprising:
    said sensing means including a pair of bellows aligned for parallel elongation and adapted to be connected respectively to receive the input pressures, a yoke rotatable about an intermediate point and connected respectively at both ends to said bellows, said baffle member being operatively connected to one end of said yoke for linear motion proportional to said pressure difference.

* * * * *